United States Patent
Wiebe et al.

(10) Patent No.: US 9,267,689 B2
(45) Date of Patent: Feb. 23, 2016

(54) COMBUSTOR APPARATUS IN A GAS TURBINE ENGINE

(71) Applicants: David J. Wiebe, Orlando, FL (US); Stephen A. Ramier, Fredericton (CA); Robert H. Bartley, Oviedo, FL (US); Daniel W. Garan, Chuluota, FL (US); Erick J. Deane, Orlando, FL (US); Mark L. Adamson, Orlando, FL (US); Yadollah Naghian, Waxhaw, NC (US)

(72) Inventors: David J. Wiebe, Orlando, FL (US); Stephen A. Ramier, Fredericton (CA); Robert H. Bartley, Oviedo, FL (US); Daniel W. Garan, Chuluota, FL (US); Erick J. Deane, Orlando, FL (US); Mark L. Adamson, Orlando, FL (US); Yadollah Naghian, Waxhaw, NC (US)

(73) Assignee: Siemens Aktiengesellschaft, München (DE)

( * ) Notice: Subject to any disclaimer, the term of this patent is extended or adjusted under 35 U.S.C. 154(b) by 527 days.

(21) Appl. No.: 13/783,857

(22) Filed: Mar. 4, 2013

(65) Prior Publication Data

US 2014/0245740 A1    Sep. 4, 2014

(51) Int. Cl.
| F23R 3/28 | (2006.01) |
| F02C 7/22 | (2006.01) |
| F16L 13/007 | (2006.01) |
| F23R 3/34 | (2006.01) |
| F16L 41/08 | (2006.01) |

(52) U.S. Cl.
CPC ... *F23R 3/28* (2013.01); *F02C 7/22* (2013.01); *F02C 7/222* (2013.01); *F16L 13/007* (2013.01); *F16L 41/084* (2013.01); *F23R 3/283* (2013.01); *F23R 3/286* (2013.01); *F23R 3/34* (2013.01); *F05D 2300/506* (2013.01); *F05D 2300/50211* (2013.01); *F05D 2300/50212* (2013.01); *F23K 2301/20* (2013.01); *F23R 2900/00005* (2013.01)

(58) Field of Classification Search
CPC ............ F23R 3/28; F23R 3/60; F23R 3/283; F23R 3/286; F16L 5/06; F16L 9/046; F16L 9/08; F16L 9/10; F16L 41/08; F16L 41/12; F02C 7/22
See application file for complete search history.

(56) References Cited

U.S. PATENT DOCUMENTS

| 3,311,392 | A | 3/1967 | Buschow |
| 4,037,864 | A | 7/1977 | Anderson et al. |
| 4,441,323 | A | * | 4/1984 | Colley ............... F23R 3/283 60/737 |
| 4,798,404 | A | 1/1989 | Iyanicki |
| 4,826,218 | A | 5/1989 | Zahuranec |
| 5,771,696 | A | 6/1998 | Hansel et al. |

(Continued)

FOREIGN PATENT DOCUMENTS

| FR | 891165 A | 2/1944 |
| GB | 2284885 A | 6/1995 |

*Primary Examiner* — Charles Freay
*Assistant Examiner* — Kenneth J Hansen

(57) ABSTRACT

A combustor apparatus defines a combustion zone where air and fuel are burned to create high temperature combustion products. The combustor apparatus includes an outer wall, coupling structure on the outer wall adjacent to a fuel inlet opening thereof, a fuel injection system, a fuel feed assembly, and a fitting member. The fuel injection system provides fuel to be burned in the combustion zone. The fuel supply structure includes a threaded inner surface formed from a first material. The fuel feed assembly includes a fuel feed pipe that extends through the fuel inlet opening in the outer wall and has an outlet portion formed from the first material and that is threadedly engaged with the fuel supply structure, and an inlet portion affixed to the outlet portion and formed from a second material. The fitting member secures the fuel feed assembly relative to the outer wall.

20 Claims, 4 Drawing Sheets

(56) References Cited

U.S. PATENT DOCUMENTS

| | | |
|---|---|---|
| 6,189,321 B1 | 2/2001 | Banhardt et al. |
| 6,711,898 B2 | 3/2004 | Laing et al. |
| 7,107,773 B2 | 9/2006 | Little |
| 7,810,336 B2 | 10/2010 | Moraes |
| 7,966,819 B2 | 6/2011 | Bishara et al. |
| 8,210,211 B2 | 7/2012 | McMasters et al. |
| 8,312,727 B2 | 11/2012 | Bishara et al. |
| 2005/0039457 A1 | 2/2005 | Moraes |
| 2008/0245901 A1 | 10/2008 | Bishara et al. |
| 2010/0281881 A1 | 11/2010 | Morenko |
| 2011/0056206 A1 | 3/2011 | Wiebe |
| 2011/0067404 A1 | 3/2011 | Johnson et al. |
| 2011/0154824 A1 | 6/2011 | Fiebig et al. |
| 2012/0204575 A1 | 8/2012 | Carlisle |

* cited by examiner

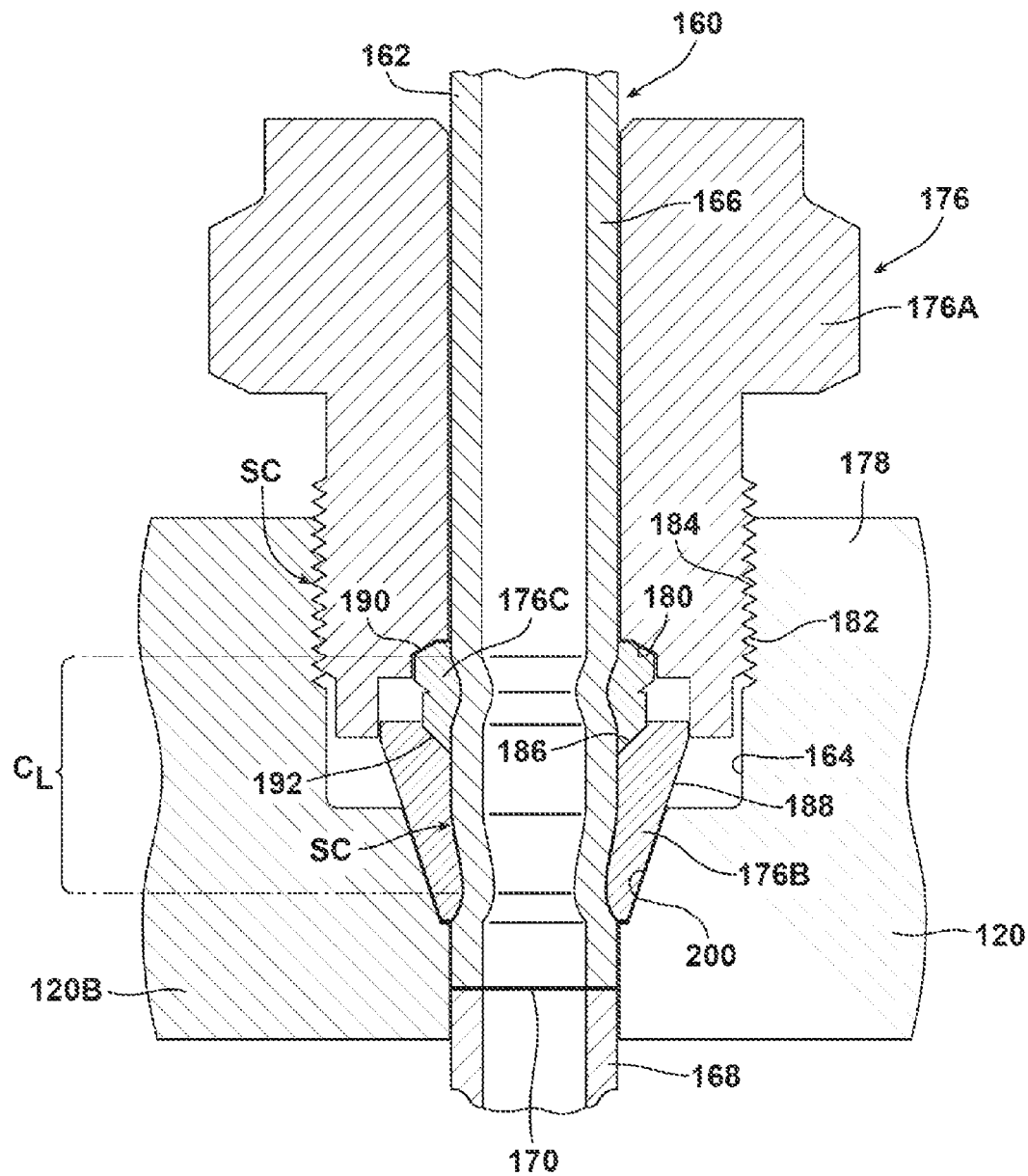

COMBUSTOR APPARATUS IN A GAS TURBINE ENGINE

FIELD OF THE INVENTION

The present invention relates to a combustor apparatus in a gas turbine engine, and, more particularly, to a combustor apparatus that includes a fuel feed pipe having a first end formed from a first material and a second end formed from a second material different from the first material.

BACKGROUND OF THE INVENTION

In gas turbine engines, fuel is delivered from one or more fuel sources to a combustion section including one or more combustor apparatuses where the fuel is mixed with air and ignited to generate hot combustion products defining working gases. The working gases are directed from the combustion section to a turbine section. Each combustion apparatus may comprise one or more stages, each stage supplying fuel to be ignited within the respective combustor apparatus.

SUMMARY OF THE INVENTION

In accordance with a first embodiment of the present invention, a combustor apparatus is provided in a gas turbine engine. The combustor apparatus defines a combustion zone where air and fuel are burned to create high temperature combustion products. The combustor apparatus comprises an outer wall defining an interior volume and comprising a fuel inlet opening, coupling structure on the outer wall adjacent to the fuel inlet opening, the coupling structure comprising a threaded inner coupling portion, a fuel injection system, a fuel feed assembly, and a fitting member. The fuel injection system is at least partially located in the interior volume of the outer wall and comprises fuel supply structure for providing fuel to at least one fuel injector that delivers fuel to be burned in the combustion zone. The fuel supply structure includes a threaded inner surface formed from a first material having a first hardness and a first coefficient of thermal expansion. The fuel feed assembly delivers fuel to the fuel injection system and includes a fuel feed pipe that extends through the fuel inlet opening in the outer wall. The fuel feed pipe comprises an outlet portion formed from the first material and including a threaded outer surface that is threadedly engaged with the threaded inner surface of the fuel supply structure to create a first sealed coupling with the fuel supply structure, and an inlet portion affixed to the outlet portion and formed from a second material having a second hardness softer than the first hardness and a second coefficient of thermal expansion. The fitting member is disposed about and engaged with the inlet portion of the fuel feed pipe and comprises a threaded outer coupling portion that is threadedly engaged with the inner coupling portion of the coupling structure to create a second sealed coupling with the coupling structure and to secure the fuel feed assembly relative to the outer wall.

In accordance with a second embodiment of the invention, a combustor apparatus is provided in a gas turbine engine. The combustor apparatus defines a combustion zone where air and fuel are burned to create high temperature combustion products. The combustor apparatus comprises an outer wall defining an interior volume and comprising a fuel inlet opening, a coupling member affixed to the outer wall adjacent to the fuel inlet opening, the coupling member comprising a threaded inner coupling portion, a fuel injection system, a fuel feed assembly, and a fitting member. The fuel injection system is at least partially located in the interior volume of the outer wall and comprises fuel supply structure for providing fuel to at least one fuel injector that delivers fuel to be burned upstream from a main burn zone in the combustion zone. The fuel supply structure includes a threaded inner surface formed from a first material having a first hardness and a first coefficient of thermal expansion. The fuel feed assembly delivers fuel to the fuel injection system and includes a fuel feed pipe that extends through the fuel inlet opening in the outer wall. The fuel feed pipe comprises an outlet portion formed from the first material and that is threadedly engaged with the threaded inner surface of the fuel supply structure inside of the interior volume of the outer wall to create a first sealed coupling with the fuel supply structure, and an inlet portion affixed to the outlet portion and formed from a second material having a second hardness softer than the first hardness. The fitting member is disposed about and engaged with the inlet portion of the fuel feed pipe and comprises a threaded outer coupling portion that is threadedly engaged with the inner coupling portion of the coupling member to secure the fuel feed assembly relative to the outer wall. The fitting member creates a compression fitting with the coupling member to clamp the fuel feed pipe in place at a clamping location.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 3 is a side cross sectional view of a portion of a combustor apparatus according to another embodiment of the invention.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
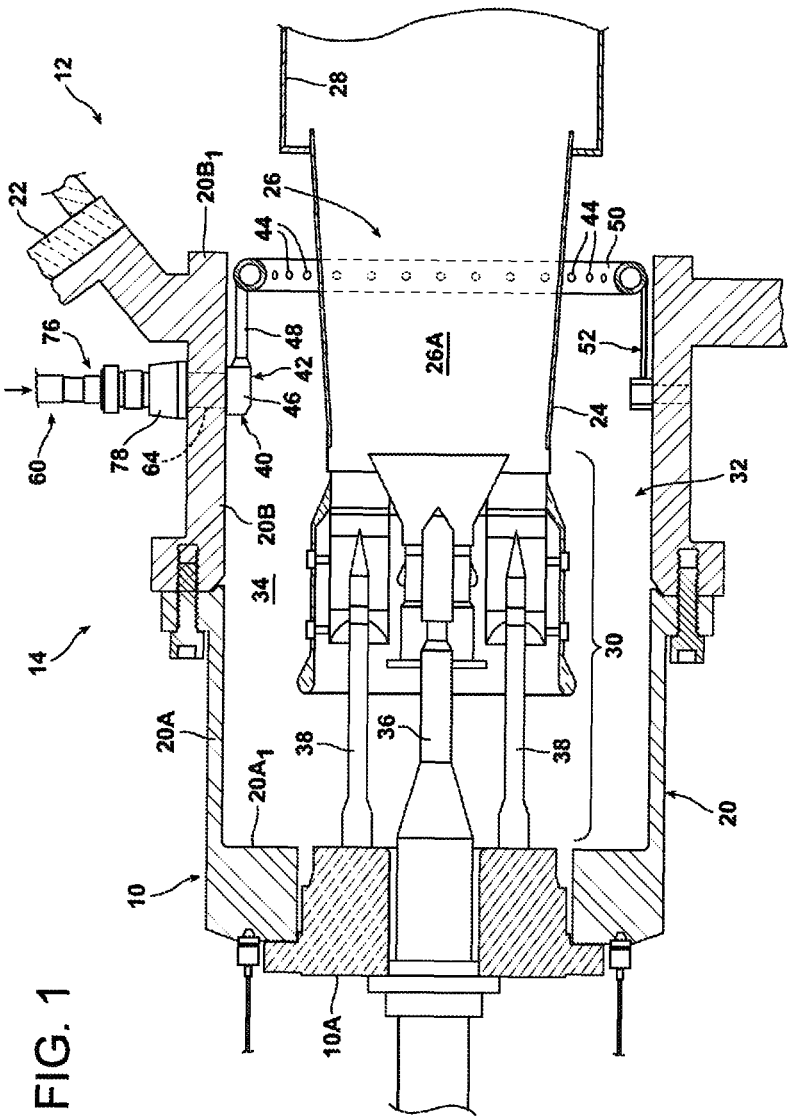
FIG. 1 is a schematic cross sectional view of a combustor apparatus for use in a gas turbine engine according to an embodiment of the invention.

Referring to FIG. 1, a combustor apparatus 10 for use in a combustion section 12 of a gas turbine engine 14 is schematically shown. The combustor apparatus 10 illustrated in FIG. 1 may form part of a can-annular combustion section 12, which may comprise an annular array of combustor apparatuses 10 similar to the one illustrated in FIG. 1 and described herein. The combustor apparatus 10 is provided to burn fuel and compressed air from a compressor section (not shown) to create hot combustion products defining a hot working gas that is provided to a turbine section (not shown) where the working gas is expanded to provide rotation of a turbine rotor (not shown) and to provide output power, which may be used to produce electricity.

The combustor apparatus 10 illustrated in FIG. 1 comprises an outer wall 20, also known as a combustor shell or a portal wall, coupled to an engine casing 22, a liner 24 that defines a combustion zone 26 where fuel and compressed air are mixed and burned to create the combustion products, a transition duct 28 coupled to the liner 24 for delivering the combustion products to the turbine section, and a main fuel injection system 30 that is provided to deliver fuel into a main burn zone 26A of the combustion zone 26.

The outer wall 20 in the embodiment shown comprises a generally cylindrical member that defines an interior volume 32. An outer portion of the interior volume 32 between the outer wall 20 and the liner 24 defines an air flow passageway 34 through which the compressed air to be delivered into the combustion zone 26 flows. The outer wall 20 includes a first section 20A that includes a first end $20A_1$ located at a head end 10A of the combustor apparatus 10, and a second section 20B that is connected to the first section 20A, e.g., by bolting, and includes a second end $20B_1$ distal from the first end $20A_1$ and that is coupled to the engine casing 22.

In the illustrated embodiment, the main fuel injection system 30 comprises a central pilot fuel injector 36 and an annular array of main fuel injectors 38 disposed about the pilot fuel injector 36. However, the main fuel injection system 30 could include other configurations without departing from the spirit and scope of the invention. The pilot fuel injector 36 and the main fuel injectors 38 each deliver fuel into the main burn zone 26A of the combustion zone 26 during operation of the engine 14.

The combustor apparatus 10 illustrated in FIG. 1 further comprises a pre-mixing fuel injection assembly 40, also known as a C-stage fuel injection system, at least a portion of which is located in the interior volume 32 of the outer wall 20 between the outer wall 20 and the liner 24. The pre-mixing fuel injection assembly 40 delivers an amount of fuel into the air passing through the air flow passageway 34, which is located upstream from the combustion zone 26, i.e., the pre-mixing fuel injection assembly 40 delivers fuel upstream from the main burn zone 26A of the combustion zone 26.

The pre-mixing fuel injection system 40 comprises fuel supply structure 42 and a plurality of fuel injectors 44 that receive fuel from the fuel supply structure 42 and inject the fuel into the air passing through the air flow passageway 34. While the fuel injectors 44 are illustrated in FIG. 1 as openings formed in an annular fuel ring 50, the fuel injectors 44 could comprise any suitable type of fuel injectors.

The fuel supply structure 42 in the embodiment shown comprises a feed block 46, a fuel supply tube 48, and the annular fuel ring 50, which delivers fuel to the fuel injectors 44. The fuel ring 50 may be supported via a plurality of ring supports 52 (only one shown in FIG. 1) connected to the outer wall 20, which ring supports 52 may be provided at intervals about the circumference of the fuel ring 50.

Figure 2:
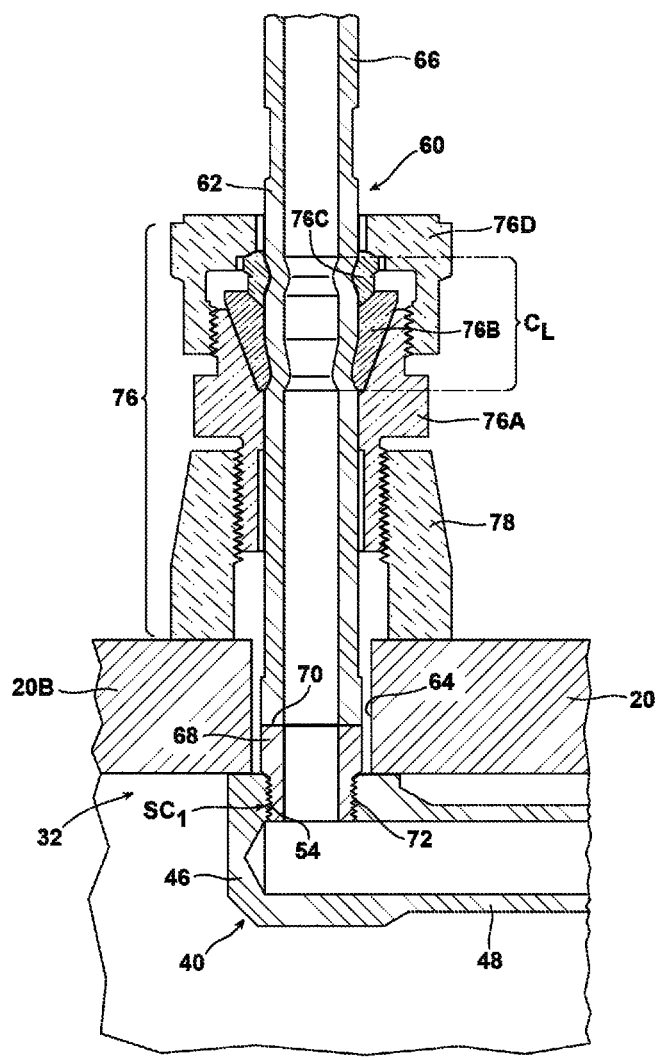
FIG. 2 is a side cross sectional view of a portion of the combustor apparatus of FIG. 1.

Referring now to FIG. 2, the feed block 46 comprises a threaded inner surface 54 formed from a first material having a first hardness and a first coefficient of thermal expansion. The first material may comprise a nickel-based metal alloy, such as, for example, an INCONEL alloy (INCONEL is a registered trademark of Special Metals Corporation), such as INCONEL 625, INCONEL 617, or INCONEL 600, or a HASTELLOY alloy (HASTELLOY is a registered trademark of Haynes International, Inc), such as HASTELLOY X. While the first material preferably comprises at least about 45% nickel by mass, other types of metals or metal alloys could be used, such as, for example, chromium-based metal alloys, or a high strength stainless steel, such as AISI 410. The first hardness of the first material preferably comprises a Brinell hardness factor of at least about 220 HB.

The combustor apparatus 10 further comprises a fuel feed assembly 60 for delivering fuel to the pre-mixing fuel injection system 40. The fuel feed assembly 60 comprises a fuel feed pipe 62 that extends through a fuel inlet opening 64 in the outer wall 20, wherein the fuel feed pipe 62 includes an inlet portion 66 and an outlet portion 68 affixed to the inlet portion 66 via a weld located at a weld joint 70. In the embodiment shown, the weld joint 70 is located within the fuel inlet opening 64 of the outer wall 20, but the weld joint 70 could be located at any suitable location between the inlet and outlet portions 66, 68 of the fuel feed pipe 62, as long as a clamping location $C_L$ (to be discussed below) is aligned with the inlet portion 66.

The inlet portion 66 of the fuel feed pipe 62 is formed from a second material having a second hardness softer than the first hardness and a second coefficient of thermal expansion, which may be the same or different than the first coefficient of thermal expansion. The second material may comprise a stainless steel, such as, for example, AISI 304, AISI 316, AISI 347 or other similar stainless steels. Such stainless steels typically have about 17-25% chromium content by mass, and 8-15% nickel content by mass, although the second material may comprise other suitable materials that are softer than the first material. The second hardness of the second material comprises a Brinell hardness factor less than that of the first material, and may be in the range of about 140-190 HB.

Referring still to FIG. 2, the outlet portion 68 of the fuel feed pipe 62 is formed from the first material and includes a threaded outer surface 72 that is threadedly engaged with the threaded inner surface 54 of the feed block 46 of the fuel supply structure 42 to create a first sealed coupling $SC_1$ with the fuel supply structure 42. In the embodiment shown, the outlet portion 68 of fuel feed pipe 62 is connected to the fuel supply structure 42 inside of the interior volume 32 of the outer wall 20, although the outlet portion 68 of fuel feed pipe 62 could be connected to the fuel supply structure 42 within the fuel inlet opening 64 or outside of the outer wall 20 if desired, as long as the clamping location $C_L$ (to be discussed below) is aligned with the inlet portion 66. Since the outlet portion 68 of the fuel feed pipe 62 and the threaded inner surface 54 of the feed block 46 are both formed from the first material (the feed block 46 itself and the other components of the pre-mixing fuel injection system 40 may also be formed from the first material), relative differences in thermal expansion between these two components are believed to be minimized or avoided during operation of the engine 14, such that the first sealed coupling is believed to substantially remain tight, secure, and structurally sound during operation of the engine.

Figure 2A:
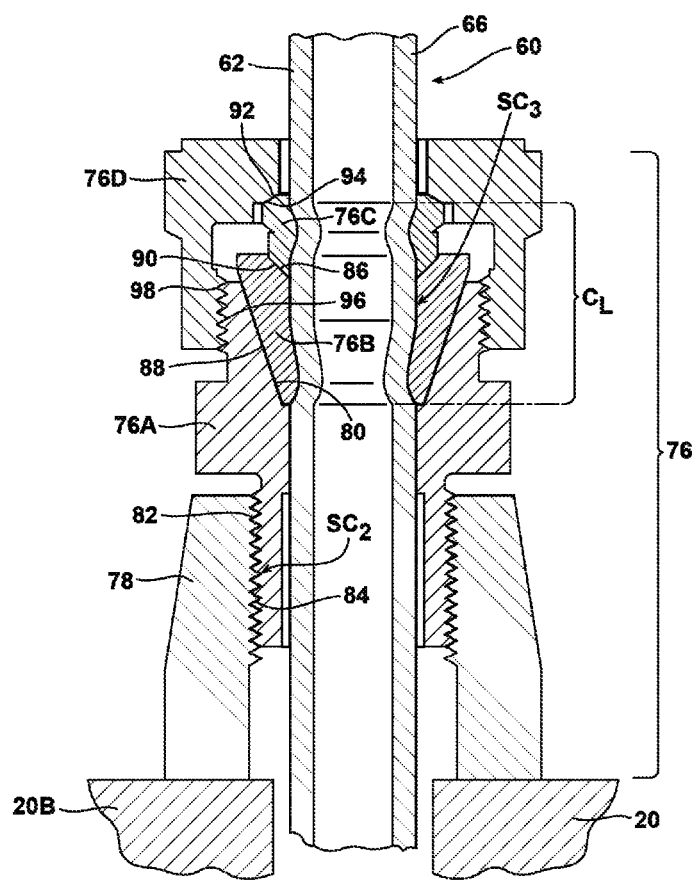
FIG. 2A is an enlarged view of a portion of FIG. 2.

Referring now to FIGS. 2 and 2A, the combustor apparatus 10 according to this embodiment of the invention also comprises a fitting member 76 disposed about and engaged with a portion of the inlet portion 66 of the fuel feed pipe 62, and coupling structure comprising a coupling member 78, which is affixed to the outer wall 20 adjacent to the fuel inlet opening 64. The fitting member 76 of FIGS. 2 and 2A comprises four pieces 76A-D and may be formed from the second material or any suitable material, although it is preferably formed from a material that is at least as hard as the second material.

As shown in FIG. 2A, the first piece 76A comprises a sloped inner surface 80 and a threaded outer coupling portion 82 that is threadedly engaged with an inner coupling portion 84 of the coupling member 78 to create a second sealed coupling $SC_2$. The second piece 76B comprises a sloped inner surface 86 and a sloped outer surface 88 that slides along the sloped inner surface 80 of the first piece 76A during a compression fitting installation as will be discussed herein. The third piece 76C comprises first and second sloped outer surfaces 90, 92, wherein the first sloped surface 90 slides along the sloped inner surface 86 of the second piece 76B and the second sloped surface 92 slides along a sloped inner surface 94 of the fourth piece 76D during the compression fitting installation. The fourth piece 76D also comprises a threaded section 96 that threadedly engages a threaded section 98 of the first piece 76A during the compression fitting installation, which will now be described.

During the compression fitting installation, the first piece 76A of the fitting member 76 according to this embodiment of the invention is coupled to the coupling member 78 by threading the threaded outer coupling portion 82 of the first piece 76A of the fitting member 76 to the inner coupling portion 84 of the coupling member 78. Thereafter, with the second and third pieces 76B, 76C of the fitting member 76 disposed between the first and fourth pieces 76A, 76D, the fourth piece 76D is coupled to the first piece 76 by treading the threaded section 96 of the fourth piece 76D to threaded section 98 of the first piece 76A. As this step is performed, the respective sloped surfaces 80, 86, 88, 90, 92, 94 slide along one another to force the second and third pieces 76B, 76C of the fitting member 76 toward the inlet portion 66 of the fuel feed pipe 62, which inlet portion 66 is eventually structurally deformed by the second and third pieces 76B, 76C at the clamping location $C_L$ to clamp the fuel feed pipe 62 in place and to create a third sealed coupling $SC_3$, thus effecting the compression fitting.

It is noted that since the inlet portion 66 of the fuel feed pipe 62 is formed from the second material, which is softer than the first material forming the outlet portion 68 of the fuel feed pipe 62, the inlet portion 66 deforms more easily than would be the case if the inlet portion 66 were formed from a harder material, such as the first material.

The compression fitting between the fitting member 76 and the coupling member 78 creates the second sealed coupling $SC_2$ and structurally secures the fuel feed assembly 60 relative to the outer wall 20, and also creates the third sealed coupling $SC_3$ between the fitting member 76 and the fuel feed pipe 62. Additional details in connection with a similar type of compression fitting can be found in U.S. Pat. No. 4,826,218, the entire disclosure of which is hereby incorporated by reference herein.

During operation of the engine 14, the hot combustion products created in the combustion zone 26 heat the components in and around the combustion zone 26 to relatively high temperatures. These components experience thermal growth as a result of this heating. According to an aspect of the present invention, since the outlet portion 68 of the fuel feed pipe 62 and the threaded inner surface 54 of the feed block 46 are both formed from the same material, i.e., the first material, relative differences in thermal expansion and relative movement between these two components are believed to be minimized or avoided during operation of the engine 14. Hence, the first sealed coupling $SC_1$ is believed to substantially remain tight, secure, and structurally sound during operation of the engine 14, such that damage to these components, such as cracking, chipping, etc., which may be caused if the first sealed coupling $SC_1$ were to become loose or if the fuel feed pipe 62 were to be formed from a material that would thermally expand greater than the feed block 46, are believed to be substantially reduced or avoided.

In one alternate embodiment illustrated in FIG. 3, wherein structure similar to that described above with reference to FIGS. 1-2A has the same reference number increased by 100, the coupling structure comprises a threaded inner coupling portion 184 that is formed in the fuel inlet opening 164 of the outer wall 120, i.e., by a portion of the outer wall 120 that defines the fuel inlet opening 164, wherein the outer wall 120 itself defines the coupling member 178 according to this embodiment. The threaded inner coupling portion 184 cooperates with a fitting member 176 that includes only three pieces 176A-C in this embodiment of the invention.

Specifically, the first piece 176A of the fitting member 176 according to this embodiment of the invention includes a sloped inner surface 180 and a threaded outer coupling portion 182 that is threadedly engaged with the inner coupling portion 184 of the coupling structure to create a sealed coupling SC during a compression fitting installation as will be discussed herein. The second piece 176B comprises a sloped inner surface 186 and a sloped outer surface 188 that slides along a sloped inner surface 200 of the outer wall 120, which sloped inner surface 200 defines a portion of the fuel inlet opening 164 of the outer wall 120, during the compression fitting installation. The third piece 176C comprises first and second sloped outer surfaces 190, 192, wherein the first sloped surface 190 slides along the sloped inner surface 180 of the first piece 176A and the second sloped surface 192 slides along the sloped inner surface 186 of the second piece 176B during the compression fitting installation, which will now be described.

During the compression fitting installation according to this embodiment of the invention, the first piece 176A of the fitting member 176 is coupled directly to the outer wall 120 by threading the threaded outer coupling portion 182 of the first piece 176A of the fitting member 176 to the inner coupling portion 184 of the coupling structure. This step is performed with the second and third pieces 176B, 176C of the fitting member 176 disposed between the first piece 176A of the fitting member 176 and the sloped inner surface 200 of the outer wall 120. As this step is performed, the respective sloped surfaces 180, 186, 188, 190, 192, 200 slide along one another to force the second and third pieces 176B, 176C of the fitting member 176 toward the inlet portion 166 of the fuel feed pipe 162, which is eventually structurally deformed by the second and third pieces 176B, 176C of the fitting member 176 at a clamping location $C_L$ to clamp the fuel feed pipe 162 in place, thus effecting the compression fitting. The compression fitting between the fitting member 176 and the coupling structure creates another sealed coupling SC and structurally secures the fuel feed assembly 160 relative to the outer wall 120.

It is noted that the inlet portion 166 of the fuel feed pipe 162 is formed from a material, i.e., the second material as described above, which is softer than a material forming the outlet portion 168 of the fuel feed pipe 162, i.e., the first material as described above. Hence, the inlet portion 166 deforms more easily than would be the case if the inlet portion 166 were formed from a harder material, such as the first material.

It is further noted that the outlet portion 168 of the fuel feed pipe 162 and a threaded inner surface of a feed block (as described above with reference to FIGS. 1 and 2 but not shown in this embodiment), according to this embodiment are both formed from the first material, such that the thermal growth properties and advantages discussed above with reference to the embodiment of FIGS. 1-2A are also realized in this embodiment of the invention.

It is also noted that any suitable type of threading may be used at the threaded coupling locations discussed herein. However, the threadings associated with at least the sealed couplings disclosed herein are preferably capable of performing sealing functions as well as coupling functions While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A combustor apparatus in a gas turbine engine, the combustor apparatus defining a combustion zone where air and fuel are burned to create high temperature combustion products, the combustor apparatus comprising:
    an outer wall defining an interior volume and comprising a fuel inlet opening;
    coupling structure on the outer wall adjacent to the fuel inlet opening, the coupling structure comprising a threaded inner coupling portion;
    a fuel injection system at least partially located in the interior volume of the outer wall and comprising fuel supply structure for providing fuel to at least one fuel injector that delivers fuel to be burned in the combustion zone, the fuel supply structure including a threaded inner surface formed from a first material having a first hardness and a first coefficient of thermal expansion;
    a fuel feed assembly for delivering fuel to the fuel injection system, the fuel feed assembly including a fuel feed pipe that extends through the fuel inlet opening in the outer wall and comprises:
        an outlet portion formed from the first material and including a threaded outer surface that is threadedly engaged with the threaded inner surface of the fuel supply structure to create a first sealed coupling with the fuel supply structure; and
        an inlet portion affixed to the outlet portion and formed from a second material having a second hardness softer than the first hardness and a second coefficient of thermal expansion; and
    a fitting member disposed about and engaged with the inlet portion of the fuel feed pipe and comprising a threaded outer coupling portion, the threaded outer coupling portion being threadedly engaged with the inner coupling portion of the coupling structure to:
        create a second sealed coupling with the coupling structure; and
        secure the fuel feed assembly relative to the outer wall.

2. The combustor apparatus of claim 1, wherein the coupling structure comprises a coupling member that is affixed to the outer wall adjacent to the fuel inlet opening.

3. The combustor apparatus of claim 2, wherein the fitting member creates a compression fitting with the coupling member to clamp the fuel feed pipe in place at a clamping location, wherein a third sealed coupling is formed between the fitting member and the inlet portion of the fuel feed pipe at the clamping location.

4. The combustor apparatus of claim 3, wherein the fitting member is formed from the second material.

5. The combustor apparatus of claim 3, wherein the fitting member structurally deforms the inlet portion of the fuel feed pipe at the clamping location.

6. The combustor apparatus of claim 1, wherein the inlet portion of the fuel feed pipe is welded to the outlet portion thereof at a weld joint.

7. The combustor apparatus of claim 6, wherein the weld joint is located inside the fuel inlet opening in the outer wall.

8. The combustor apparatus of claim 1, wherein the first material comprises a metal alloy including at least 45% nickel by mass.

9. The combustor apparatus of claim 8, wherein the second material comprises stainless steel.

10. The combustor apparatus of claim 1, wherein the fuel supply system delivers fuel upstream from a main burn zone in the combustion zone.

11. The combustor apparatus of claim 1, wherein the outlet portion of fuel feed pipe is connected to the fuel supply structure inside of the interior volume of the outer wall.

12. The combustor apparatus of claim 1, wherein the interior volume of the outer wall defines a passageway for air on its way to the combustion zone.

13. A combustor apparatus in a gas turbine engine, the combustor apparatus defining a combustion zone where air and fuel are burned to create high temperature combustion products, the combustor apparatus comprising:
    an outer wall defining an interior volume and comprising a fuel inlet opening;
    a coupling member affixed to the outer wall adjacent to the fuel inlet opening, the coupling member comprising a threaded inner coupling portion;
    a fuel injection system at least partially located in the interior volume of the outer wall and comprising fuel supply structure for providing fuel to at least one fuel injector that delivers fuel to be burned upstream from a main burn zone in the combustion zone, the fuel supply structure including a threaded inner surface formed from a first material having a first hardness and a first coefficient of thermal expansion;
    a fuel feed assembly for delivering fuel to the fuel injection system, the fuel feed assembly including a fuel feed pipe that extends through the fuel inlet opening in the outer wall and comprises:
        an outlet portion formed from the first material and being threadedly engaged with the threaded inner surface of the fuel supply structure inside of the interior volume of the outer wall to create a first sealed coupling with the fuel supply structure; and
        an inlet portion affixed to the outlet portion and formed from a second material having a second hardness softer than the first hardness; and
    a fitting member disposed about and engaged with the inlet portion of the fuel feed pipe and comprising a threaded outer coupling portion, the threaded outer coupling portion being threadedly engaged with the inner coupling portion of the coupling member to secure the fuel feed assembly relative to the outer wall, wherein the fitting member creates a compression fitting with the coupling member to clamp the fuel feed pipe in place at a clamping location.

14. The combustor apparatus of claim 13, wherein the fitting member is formed from the second material.

15. The combustor apparatus of claim 13, wherein, due to the compression fitting with the coupling member, the fitting member structurally deforms the inlet portion of the fuel feed pipe at the clamping location.

16. The combustor apparatus of claim 14, wherein a second sealed coupling is formed between the fitting member the coupling member and a third sealed coupling is formed between the fitting member and the inlet portion of the fuel feed pipe at the clamping location.

17. The combustor apparatus of claim 13, wherein the inlet portion of the fuel feed pipe is welded to the outlet portion thereof at a weld joint that is located inside the fuel inlet opening in the outer wall.

18. The combustor apparatus of claim 13, wherein the first material comprises a metal alloy including at least 45% nickel by mass.

19. The combustor apparatus of claim 18, wherein the second material comprises stainless steel.

20. The combustor apparatus of claim 13, wherein the interior volume of the outer wall defines a passageway for air on its way to the combustion zone.

\* \* \* \* \*